(12) United States Patent
Huggahalli et al.

(10) Patent No.: US 12,141,075 B2
(45) Date of Patent: Nov. 12, 2024

(54) ADDRESS TRANSLATION PREFETCHING FOR INPUT/OUTPUT DEVICES

(71) Applicant: Microsoft Technology Licensing, LLC, Redmond, WA (US)

(72) Inventors: Ramakrishna Huggahalli, Scottsdale, AZ (US); Shachar Raindel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 17/836,936

(22) Filed: Jun. 9, 2022

(65) Prior Publication Data
US 2023/0401160 A1 Dec. 14, 2023

(51) Int. Cl.
*G06F 12/1045* (2016.01)
*G06F 12/02* (2006.01)
*G06F 12/06* (2006.01)
*G06F 12/0862* (2016.01)

(52) U.S. Cl.
CPC ...... *G06F 12/1063* (2013.01); *G06F 12/0238* (2013.01); *G06F 12/063* (2013.01); *G06F 12/0862* (2013.01); *G06F 12/1054* (2013.01)

(58) Field of Classification Search
CPC ............. G06F 12/1027; G06F 12/1036; G06F 12/1081; G06F 13/28; G06F 2212/654; G06F 12/0862; G06F 12/1009; G06F 12/109; G06F 2212/602; G06F 2212/657; G06F 2212/68; G06F 3/0659
See application file for complete search history.

(56) References Cited

U.S. PATENT DOCUMENTS

| | | | |
|---|---|---|---|
| 8,914,458 B2 | 12/2014 | Raindel et al. | |
| 9,619,402 B1* | 4/2017 | Zhang | G06F 12/1027 |
| 2012/0226888 A1* | 9/2012 | Rychlik | G06F 12/1027 |
| | | | 711/207 |
| 2013/0227245 A1* | 8/2013 | Gupta | G06F 12/1027 |
| | | | 711/205 |
| 2013/0339650 A1* | 12/2013 | Alexander | G06F 12/0862 |
| | | | 711/205 |
| 2014/0281055 A1 | 9/2014 | Davda et al. | |
| 2015/0067297 A1* | 3/2015 | Arroyo | G06F 13/28 |
| | | | 711/206 |

(Continued)

FOREIGN PATENT DOCUMENTS

EP 3367248 A1 8/2018

OTHER PUBLICATIONS

"International Search Report and Written Opinion Issued in PCT Application No. PCT/US23/019037", Mailed Date : Jul. 26, 2023, 19 Pages.

*Primary Examiner* — Yaima Rigol

(57) ABSTRACT

In one example of the present technology, an input/output memory management unit (IOMMU) of a computing device is configured to: receive a prefetch message including a virtual address from a central processing unit (CPU) core of a processor of the computing device; perform a page walk on the virtual address through a page table stored in a main memory of the computing device to obtain a prefetched translation of the virtual address to a physical address; and store the prefetched translation of the virtual address to the physical address in a translation lookaside buffer (TLB) of the IOMMU.

14 Claims, 11 Drawing Sheets

(56) References Cited

U.S. PATENT DOCUMENTS

| | | |
|---|---|---|
| 2017/0162179 A1* | 6/2017 | Bogusz ............... G06F 12/1027 |
| 2019/0095343 A1 | 3/2019 | Gopal |
| 2019/0243778 A1* | 8/2019 | Nikoleris ................ G11C 8/06 |
| 2020/0065257 A1* | 2/2020 | Ghiggini ............. G06F 12/0897 |
| 2020/0371953 A1 | 11/2020 | Guo et al. |
| 2021/0149815 A1* | 5/2021 | Gayen .................... G06F 12/10 |

* cited by examiner

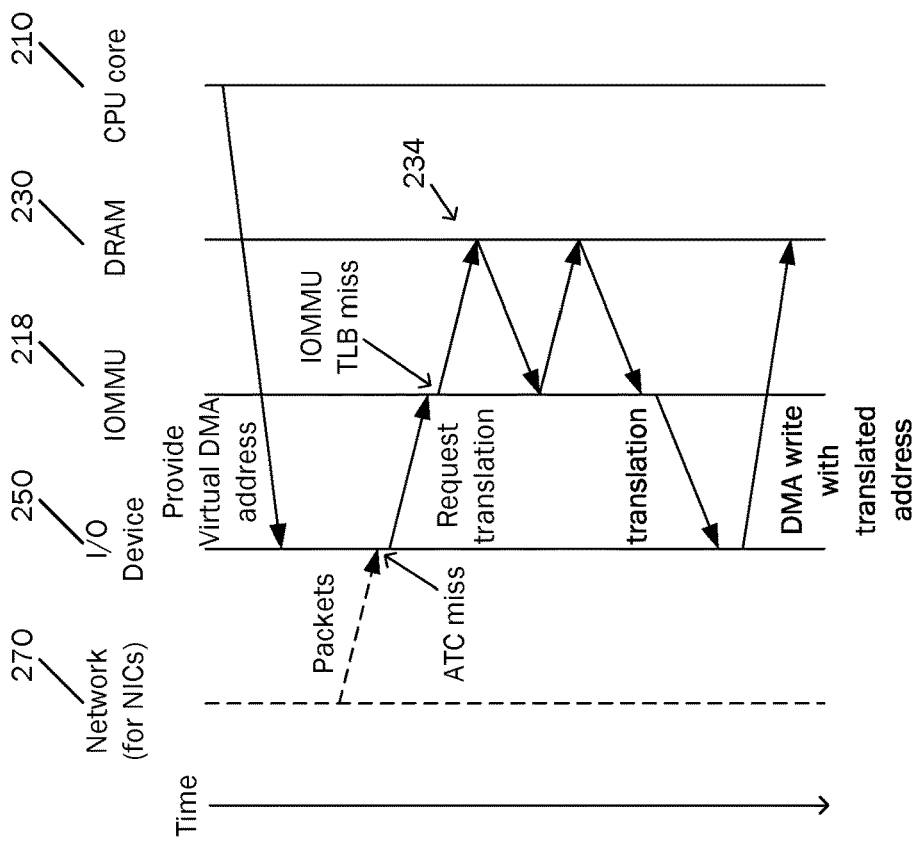
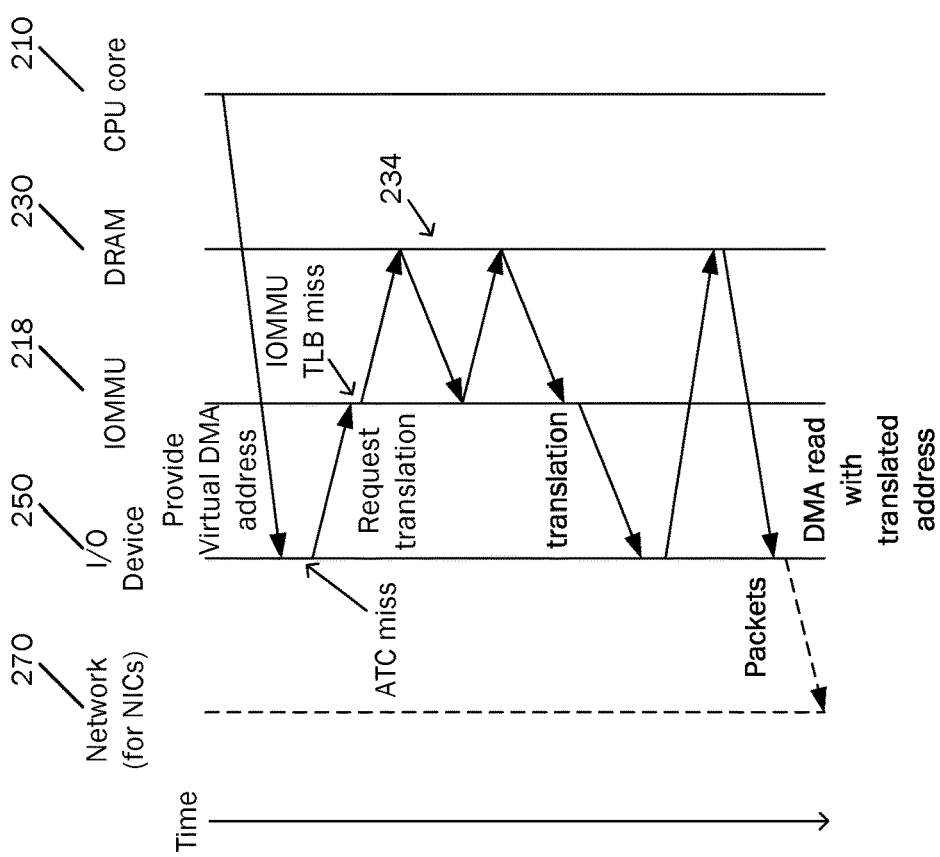

ADDRESS TRANSLATION PREFETCHING FOR INPUT/OUTPUT DEVICES

BACKGROUND

In direct memory access (DMA), input/output devices attached to a computer system communicate directly with memory without involvement of the CPU—for example, without temporarily storing the data in the registers of a CPU while in transit between the memory and the input/output devices. Direct memory access significantly improves the performance of these computer systems, because the CPU is relieved of the task of copying data between the input/output (I/O) devices and can perform other tasks for a user and because the data being copied is not constrained by any data transfer bottlenecks associated with passing data to and from the CPU.

A typical computer system includes physical memory, where various portions of the memory are accessed (e.g., read from and written to) using corresponding memory addresses. A memory location within the physical memory is typically referred to using a physical address (PA). Computer operating systems include memory management features where a software application running on the operating system accesses memory through virtual addresses that are mapped onto corresponding physical addresses. A memory management unit (MMU) of a central processing unit (CPU) provides hardware support for performing address translations between virtual addresses and physical addresses.

A DMA controller of an input/output device (I/O devices) uses the PAs to identify the locations in memory that the I/O device will be reading from or writing to using a DMA request, where the host operating system may provide these PAs directly to the I/O device. However, software applications that make use of I/O devices are typically provided with virtual addresses rather than PAs. As such, computer systems may also include an input/output memory management unit (IOMMU) or system memory management unit (SMMU) that connects a DMA-capable I/O bus to main memory, where the IOMMU or SMMU translates between virtual addresses and PAs.

In the context of computer virtualization, a hypervisor running on a host operating system manages the execution of one or more virtualized or emulated computer systems, which are referred to as guest virtual machines, and where a guest virtual machine executes a guest operating system. A guest virtual machine accesses the portion of memory that is allocated to it through its assigned virtual address space, where an address in this space may be referred to as a guest physical address (GPA). Accordingly, the guest operating system assigns virtual address spaces to software applications running on the guest operating system, where the virtual address spaces map onto the guest physical address space. This results in an additional layer of indirection between the (guest) virtual addresses seen by the application and the actual physical addresses in the host physical memory (e.g., from guest virtual address to guest physical address and from guest physical address to host physical address). Likewise, address translation must be performed so that I/O devices can continue to use application virtual addresses or guest virtual addresses, translate the virtual addresses to GPAs and HPAs (that is a physical address of the host machine), and issue DMA requests accordingly, where the GPAs are translated to HPAs in order to access the correct portions of the host physical memory.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present technology relate to improving the performance of address translation for input/output devices (I/O devices) using direct memory access techniques to move data between the I/O devices and physical memory. Some aspects of the present technology relate to priming address translation caches (e.g., stored in the I/O devices) such that address translations are available at low latency when devices issue direct memory access requests. Some aspects of the present technology relate to input/output memory management unit (IOMMU) cache management policies that reduce wasted efforts by preferentially retaining cached translation data that has not yet been used. Some additional aspects of the present technology relate to using system caches (e.g., the last level cache of the central processing unit) to selectively cache translations that do not fit in other caches. These modifications reduce latency associated with performing page walks to perform address translations between virtual addresses and physical addresses by increasing the likelihood of a cache hit in the address translation caches.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 2A is a timing diagram depicting timing of communications between an input/output (I/O) device, an I/O memory management unit (IOMMU), main memory (or dynamic random access memory or DRAM), and a host processor core in the case of a DMA read from main memory to the I/O device.

FIG. 2B is a timing diagram depicting timing of communications between an I/O device, an IOMMU, main memory, and a host processor core in the case of a DMA write from the I/O device to main memory.

DETAILED DESCRIPTION

Figure 1:
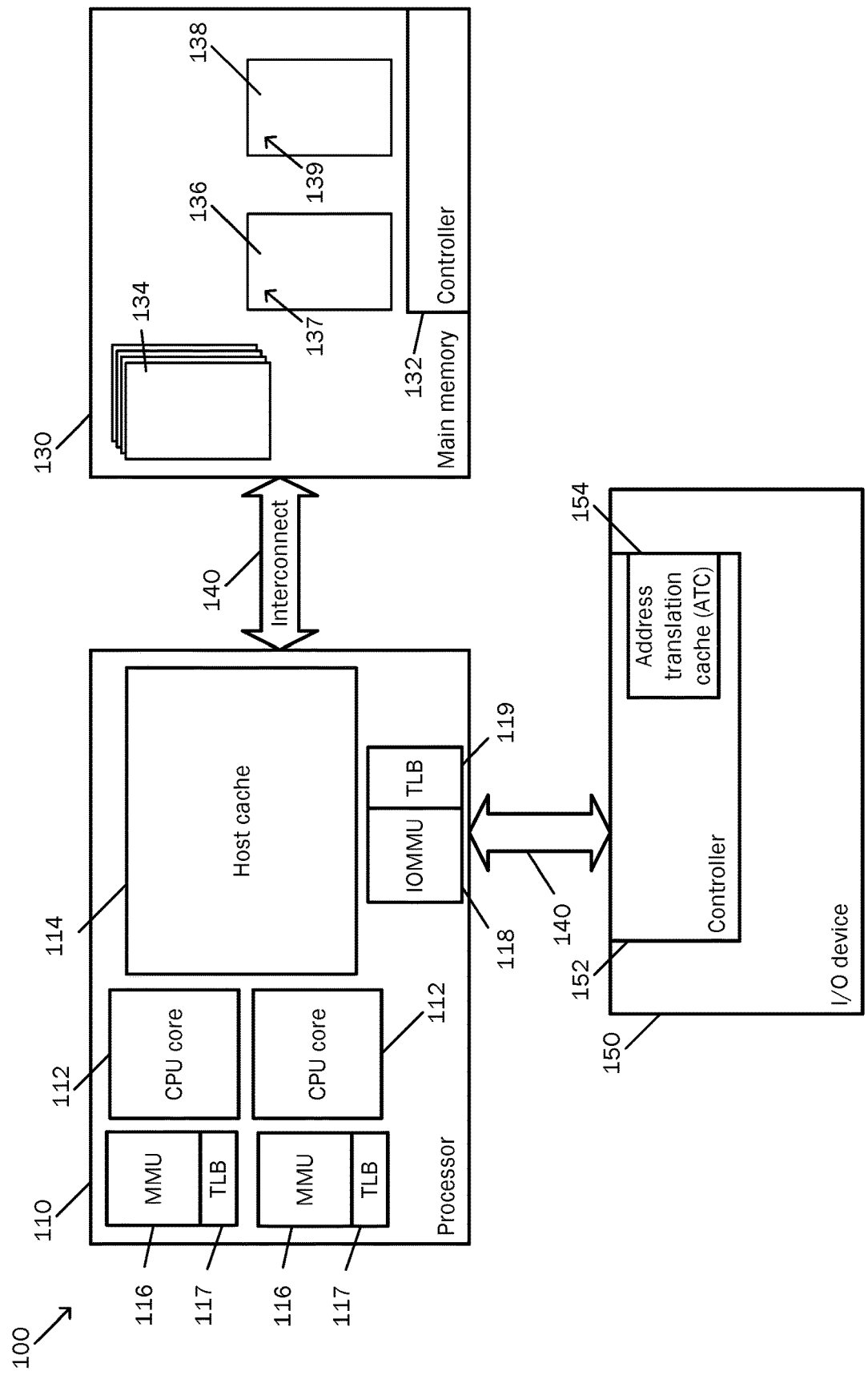
FIG. 1 a block diagram of a computing device including a processor, memory, and an input/output device which performs direct memory access (DMA) operations with the memory in accordance with some examples of the present technology.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

A typical computer system includes physical memory (e.g., random access memory or RAM), where various portions of the memory are accessed (e.g., read from and written to) using corresponding memory addresses. The RAM stores currently-running computer programs or software applications—such as web browsers, computer games, machine learning training software, word processors, and the like, and also stores data loaded by those programs—such as web pages, 3D models and images in a computer game, training datasets and statistical models for machine learning, documents loaded in a word processor, and the like.

Computer systems also typically include, or are attached to, input/output devices (I/O devices) such as graphics cards (e.g., 3D graphics accelerators), data storage devices (e.g., hard drives, solid state drives, and the like), network interface controllers for connecting to computer networks (e.g., Wi-Fi or Ethernet controllers), special-purpose accelerators (e.g., data compression/decompression accelerators, data encoding/decoding accelerators such as for error detecting codes and error correcting codes such as hardware controllers for redundant arrays of independent drives or RAID, artificial intelligence accelerators for training machine learning models or computing predictions or inferences based on machine learning models), webcams, keyboards, mice, touchscreens, printers, etc. I/O devices may be connected to the computer system via an interconnect such as Peripheral Component Interconnect Express (PCIe) or other types of system interconnect.

Some I/O devices are capable of performing direct memory access (DMA) which allows these devices to interact directly with the physical memory without the involvement of a CPU. This improves the performance of computer systems, because the CPU is relieved of the task of copying data between the input/output (I/O) devices and can therefore perform other tasks (e.g., execute other computer programs or respond to user input). In addition, the speed at which data can be transferred between the I/O device and the physical memory is not constrained by bandwidth bottlenecks associated with passing data to and from the CPU.

A memory location within the physical memory is typically referred to as a physical address (PA). A DMA controller of an I/O device uses the PAs to identify the locations in memory that the I/O device will be reading from or writing to using a DMA request, where the host operating system typically provides these PAs directly to the I/O device.

A computer operating system also typically includes memory management features such that software applications (e.g., a web browser or computer game) accesses memory through virtual addresses that are mapped onto corresponding physical addresses (PAs). Translations between virtual memory addresses and PAs can be accelerated by a hardware memory management unit (MMU) of a CPU.

Software applications that make use of DMA-capable I/O devices typically provide I/O devices with virtual addresses rather than PAs (e.g., because the underlying Pas are hidden from the applications by the operating system). As such, address translation must also be performed in order for the I/O devices to be able to issue DMA requests with the correct PAs of locations in the physical memory. In some cases, computer systems also include an input/output memory management unit (IOMMU) or, more generally, a system memory management unit (SMMU) that acts as an intermediary between a DMA-capable I/O interconnect and main memory, where the IOMMU or SMMU translates between virtual addresses and PAs. As used herein, the term input/output memory management unit (IOMMU) will be used to also include a similar or more general class of a system memory management unit (SMMU) that performs similar functions of translating between virtual addresses and physical addresses as an intermediary between a DMA-capable I/O interconnect and main memory. In some computer systems, an IOMMU and an MMU are integrated into a same physical semiconductor package as one or more CPUs. For the sake of clarity, examples of the present technology will be presented below in the context of computer systems having separate IOMMU and MMU components with the understanding that the present technology is similarly applicable to circumstances where an MMU the functions of translating virtual addresses to PAs for applications (as in a typical MMU) as well as for I/O devices (as would be performed by an IOMMU), thereby including or integrating the functionality that would otherwise be performed by separate a IOMMU.

In the case of executing applications in a non-virtualized environment, an application may provide a virtual address to a DMA-capable I/O device, and where the IOMMU assists in translating the virtual address to a physical address for performing DMA operations.

In the case of virtualized environments, two address translations may be needed: from a guest virtual address (GVA) visible to an application running on a guest virtual machine to a guest physical address (GPA) associated with the guest virtual machine (e.g., in the virtual address space allocated to the guest virtual machine) to a host physical address (HPA) associated with the host machine. In the context of virtualization, a physical address (PA) may also be referred to as a host physical address (HPA) in order to clarify that this address is distinct from a guest physical address (GPA). As noted in the background, in the context of virtual machines, a hypervisor running on a host operating system manages the execution of one or more guest virtual machines which run a corresponding guest operating system. A guest virtual machine accesses the portion of host memory that is allocated to it through its assigned virtual address space, and an address in this space may be referred to as a guest physical address (GPA). Accordingly, software applications running in the guest operating system are provided with guest virtual address spaces (GVA spaces) that map onto the guest physical address space (GPA space). In these circumstances, address translation must be performed so that guest virtual addresses (GVAs) can be translated to GPAs and where the GPAs are then translated to HPAs. This translation also applies to the use of I/O devices by guest virtual machines such that the I/O devices can issue DMA requests using the appropriate HPAs of portions of host memory allocated to the application running in the guest virtual machine. An IOMMU can also accelerate this multi-stage address translation.

Address translation generally involves looking up page tables located in host memory (page walks) to obtain or look up the translation from GVA to GPA and from GPA to HPA. Because page tables are organized hierarchically, page walks typically involve traversing multiple levels of page tables stored in main memory before obtaining an HPA which is returned to the I/O device such that the I/O device can (eventually) issue a DMA request based on the returned HPA, where each step may require a roundtrip between the MMU or IOMMU performing the page walk and the main memory. An I/O device typically encounters hundreds of nanoseconds of latency when accessing host memory. Therefore, performing these page walks through host memory to perform address translation can introduce significant delay before the I/O device receives the HPA needed to make DMA requests.

To reduce this latency (both in the case without virtualization and where translations are performed from virtual addresses to physical addresses as well as in the case of translating a GVA to a GPA and translating the GPA to a HPA), in some circumstances the host computer system provides translation caches (similar to translation lookaside buffers or TLBs inside of processor cores or CPU cores) in hardware (e.g., included within a semiconductor package together with the IOMMU and the CPU core) to hold frequently used address translations in faster memory structures (e.g. static random access memory or SRAM) to significantly reduce the latency of page walks. Sizing the TLBs appropriately can be challenging, especially when many virtual functions across multiple devices share the same TLBs. A conservatively sized (e.g., sized larger to increase the likelihood of a cache hit) TLB can be area intensive (e.g., consume a lot of physical space in the processor core due to being a larger amount of SRAM) and expensive. On the other hand, a small TLB can be ineffective in the presence of even a few traffic streams (e.g., multiple streams of DMA data between I/O devices and the host memory).

As another technique for reducing latency, the Peripheral Component Interconnect Express (PCIe) specification defines a mechanism called Address Translation Services (ATS) which allows an I/O device to request an address translation to be returned into the device. Translations can thus be stored inside a device-side Address Translation Cache (ATC) to reduce the dependency on host-side caches.

The use of Guest Virtual Addresses (GVA) further exacerbates the problem. Usage models for 'Shared Virtual Memory' (SVM) involve host processor and I/O interactions using GVAs without up-front translation by the host operating system. This means that I/O devices receive GVAs for DMA operations. These GVAs must be translated to GPAs and then subsequently to HPAs. This is often called 2-stage translation. Each level of translation may have its own TLB structures for caching address translations. Each level of the page table hierarchy may have a separate TLB. For the sake of conciseness, discussions of a translation cache herein include multiple caches that support hierarchical page tables and multiple stages of translation.

While host-side caches (e.g., TLB) and device-side caches (e.g., ATC) provide some improvements in latency by caching previously-obtained address translation results, these systems can sometimes still introduce significant latency. One issue arises due to the lack of locality in I/O access streams. For example, a computer system may have application workloads where there are hundreds of active DMA streams which may be spread across multiple virtual machines running on the same computer system. In addition, each stream may have an arbitrary (e.g., random) stride resulting in varying degrees of locality within a single page (e.g., memory accesses to nearby or local locations in memory may reuse the same address translations, but accesses to more distant locations may require additional address translations). Even when there is some locality, a 4 KB memory region requiring a single translation may be accessed in only ~64 ns with a x16 PCIe Gen5 device (having a peak bandwidth of 64 GB/s in each direction)— this data transfer time is comparable to or generally less than DRAM latency incurred when accessing translations from the perspective of an I/O device (e.g., the accessing address translations will take about as long as transferring the data itself). Input/output access characteristics, especially when devices are shared by many VMs, will tend to have low locality, and therefore may incur translation cache misses, and therefore these DMA requests will also be limited by memory latency due to needing to perform the page walks through the pages stored in host memory to perform the address translations. The translation cache miss penalties can create stalls in a data movement pipeline for I/O devices and therefore limit I/O device throughput.

As such, aspects of the present technology relate to proactively reducing or minimizing address translation cache misses or, equivalently, increasing the frequency of translation cache hits, in order to reduce latency caused by address translation, thereby increasing I/O device throughput when using DMA.

FIG. 1 a block diagram of a computing device including a processor, memory, and an input/output device which performs direct memory access (DMA) operations with the memory in accordance with some examples of the present technology. As shown in FIG. 1, a computing device 100 includes a processor 110, which includes one or more central processing unit (CPU) cores 112, a host cache 114, a memory management unit (MMU) 116 and its associated cache or translation lookaside buffer (TLB) 117 (in some processor designs, the MMU is located within the CPU core), and an input/output memory management unit (IOMMU) 118 and its associated cache or translation lookaside buffer (TLB) 119. The one or more CPU cores may be configured to execute instructions in accordance with an instruction set, such as an x86 or ARM® instruction set in order to execute programs expressed in the instruction set and to perform computational tasks. A host cache 114 (which may also be referred to herein as a system cache or last level cache) stores data and/or program instructions, where the host cache 114 is located near the CPU cores 112 (e.g., having a low latency and high bandwidth connection with the CPU cores 112) and is separate from the CPU cores 112, where access to the host cache 114 is shared by the CPU cores 112. Individual CPU cores 112 may include lower level caches (e.g., a separate level 1 or L1 cache) within each of the CPU cores 112, where these lower level caches that are exclusive to particular CPU cores 112 (not shared) are not considered to be part of the shared host cache 114. The host cache 114 may store blocks read from a main memory 130 or physical memory as well as working data that will be written to (or flushed to) main memory 130.

A memory controller 132 of the main memory 130 is connected to the processor 110 via an interconnect 140 or communications bus. The memory controller 132 of the main memory 130 is configured to receive commands from the interconnect 140 and to read from or write to particular locations in the main memory 130. As discussed above, locations in the main memory 130 may be accessed through the memory controller 132 based on their physical addresses (PAs), where an address refers to a page of memory (each page typically being a few kilobytes in size). An operating system provides memory management functions by providing applications with a virtual address space and abstracting how virtual addresses in the virtual address space map to physical addresses in a physical address space, where software applications or programs access memory locations in the main memory 130 based on virtual addresses. The mappings or translations between virtual addresses and physical addresses are typically stored in a page table 134 which is stored in the main memory 130. When a CPU core 112 accesses instructions or data from a particular memory location, as specified by a virtual address, the virtual address is translated into a physical address in order to identify the proper location within the main memory 130 for writing the data, such as a first memory page 136 or a second memory page 138. The first memory page 136 and the second memory page 138 are identified by the controller 132 based on a corresponding first physical address 137 and a corresponding second physical address 139. A memory management unit (MMU) 116 of the processor 110 performs the translation from a virtual address to a physical address by performing a page walk, that is, performing (potentially multiple) lookups through the page table 134 in the main memory 130. As noted above, additional lookups may be needed in the case of virtualization (virtual machines) and/or shared virtual memory (SVM), such as performing translations from guest virtual addresses (GVA) to guest physical addresses (GPA) to host physical addresses (HPA).

Performing a page walk is a time consuming process because the MMU 116 communicates with the main memory 130 via the interconnect 140, which have relatively high latency (e.g., compared to the clock rate of the one or more CPU core 112), where the latency arise from the inherent latency of the memory 130 and the latency arising from traversing the interconnect 140. In order to reduce the latency of performing translations from virtual addresses (or guest virtual addresses in the case of virtualization) to PAs (or HPAs in the case of virtualization), the MMU 116 may further include a cache or translation lookaside buffer (TLB) 117, which caches translations, thereby avoiding the delay associated with performing a page walk if the address translation is already cached in the TLB 117.

Taking a network interface controller (NIC) (e.g., a Wi-Fi network card or an Ethernet network card) as an example of an I/O device 150, when the computing device 100 sends data over the network, data packets may be copied from the main memory 130 to the I/O device 150 such that the I/O device 150 can transmit the data packets over the network. Likewise, when a NIC receives data packets from the network, those data packets are copied into main memory 130 such that the data can be used by software applications running on the computing device 100.

In many computer systems, a I/O device is memory mapped in that writes to a I/O device and reads from an I/O device are performed based on reserved memory addresses that are similar to the HPAs, but where the HPAs in the reserved range are directed to various I/O devices instead of to particular pages in the main memory 130.

Direct memory access (DMA) technologies allow input/output devices (I/O devices) to read and write to main memory directly, without having the data pass through a CPU core 112.

In circumstances where DMA is not being used, a processor 110 mediates the transfer of data between the main memory 130 and an I/O device 150. For example, when writing data to an I/O device, a CPU core 112 may control the reading of data from a specified address in the main memory 130 into a register in the CPU core 112 and then copy the data from the register to the memory mapped location corresponding to the I/O device 150 (e.g., a memory buffer in the controller 152 of the I/O device 150). Likewise, when transferring data from an I/O device 150 to main memory 130, a CPU core 112 may copy data from the memory buffer in the controller 152 to a register of the CPU core 112 and from the register of the CPU core 112 to a specified address in the main memory 130.

In contrast, when DMA is used, a processor 110 may send a DMA stream setup command to the controller 152 of a DMA-capable I/O device, where the command specifies a memory location in the main memory 130. The I/O device 150 may then perform writes directly to the specified memory location in the main memory 130 or perform reads from the specified memory location, without an intermediate storage of the data in the processor 110 (e.g., in a register of a CPU core 112).

Because the DMA stream setup command is issued by software applications running on the processor 110, the processor 110 typically makes system calls that cause the operating system to translate virtual addresses provided by the software applications into physical addresses, where the physical addresses are then sent to the device. However, performing the address translation using a system call to the operating system generally incurs significant software processing overhead. Therefore, in some approaches to DMA, the memory location specified in the DMA stream setup command is a virtual address (e.g., a guest virtual address). Therefore, address translation is performed to translate the virtual addresses provided by software applications into the PAs (or HPAs) that correspond to the actual memory locations in the main memory 130 to be accessed by the I/O device 150, in a manner similar to that for applications running on the processor. Some computer systems further include an input/output memory management unit (IOMMU) 118 configured to perform the page walks through the page table 134 to translate the virtual addresses used by an I/O device 150 into PAs, which effectively eliminates the software overhead associated with translating addresses in some computer systems that perform the address translations using operating system-level system calls. Like the MMU 116, the IOMMU 118 may also have a cache or translation lookaside buffer (TLB) 119 that stores or caches previously-determined translations between virtual addresses and PAs, thereby reducing or avoiding the latency associated with performing a full page walk through the page table 134.

In some systems, the controller 152 of an I/O device further includes an address translation cache (ATC) 154, which is further configured to cache translations from virtual addresses to PAs, such that the controller 152 of the I/O device does not need to request an address translation from the IOMMU 118.

FIG. 2A is a timing diagram depicting a DMA stream setup command and timing of communications between an input/output (I/O) device, an I/O memory management unit (IOMMU), main memory (or dynamic random access memory or DRAM), and a host processor core in the case of a DMA read from main memory to the I/O device.

As shown in FIG. 2A, a CPU core 210 transmits a DMA stream setup command to an I/O device 250 (e.g., a network interface controller or NIC). The DMA stream setup command specifies a virtual address of data in the main memory (or DRAM) 230 to be written to the I/O device (e.g., for transmission to a network 270). When a DMA controller of the I/O device 250 attempts to execute the command (e.g., to retrieve data from the location in main memory 230), the DMA controller needs to translate the virtual address to a physical address (PA), and may first check a cache (e.g., an address translation cache ATC) in the I/O device 250. In the scenario shown in FIG. 2A, it is assumed that this is a new request and therefore the required translation of the current virtual address is not present in the ATC, and therefore the attempted lookup in the cache results in an ATC miss. Due to the ATC miss, the DMA controller of the I/O device 250 requests an address translation from the IOMMU 218.

In the example shown in FIG. 2A, when the IOMMU 218 receives the translation request, it also checks a cache (e.g., a translation lookaside buffer or TLB) of the IOMMU. As above, it is assumed that this is the first time that this particular virtual address is being looked up and therefore the attempted lookup in the TLB results in an IOMMU TLB miss. Accordingly, the IOMMU performs a page walk at 234 through a page table stored in the main memory (or DRAM) 230. As previously discussed, performing the page walk may require multiple lookups that require multiple roundtrips between the IOMMU 218 and the DRAM 230, as shown by the four arrows in FIG. 2A. After the page walk is complete, the IOMMU 218 has computed or obtained the translation of its input virtual address into a physical address (PA) and the IOMMU 218 returns the translation to the I/O device 250.

Using the translation or translated address (the obtained PA associated with the original virtual address), the I/O device 250 issues a DMA read request directly to DRAM 230. The DRAM 230 retrieves the data at the PA specified in the DMA read request and returns it to the I/O device 250 for further use (e.g., sending the data as network packets on the network 270).

As shown in FIG. 2A, a significant amount of time is spent performing the translation from virtual address to PA before the DMA read can be performed.

FIG. 2B is a timing diagram depicting a DMA stream setup command and timing of communications between an I/O device, an IOMMU, main memory, and a CPU core in the case of a DMA write from the I/O device to main memory. In a manner similar to FIG. 2A, a CPU core 210 transmits a DMA stream setup command to an I/O device 250 (e.g., a network interface controller or NIC). The DMA stream setup command specifies a virtual address in the main memory 230 where data is to be written from the I/O device (e.g., where the I/O device 250 stores data received from a network 270).

In this case, there may be a time delay between when the DMA stream setup command is sent to the I/O device 250 and when data is ready to be written from the I/O device 250 to the DRAM 230 (e.g., while awaiting arrival of data packets from the network 270). When such data does arrive, a DMA controller of the I/O device 250 may attempt to execute a DMA write, but will first need to translate the virtual address specified in the DMA stream setup command into a physical address in the DRAM 230. Accordingly, the DMA controller may first attempt to look up the address in its cache (e.g., ATC). As before, in the scenario shown in FIG. 2A, it is assumed that this is a new request and therefore the required translation of the current virtual address is not present in the ATC, and therefore the attempted lookup in the cache results in an ATC miss. Due to the ATC miss, the DMA controller of the I/O device 250 requests an address translation from the IOMMU 218. In a manner similar to that described with respect to FIG. 2A, the IOMMU performs a page walk at 234 to translate the virtual address to a corresponding PA and returns the translation to the I/O device 250 which performs a DMA write of data using the translated address (the PA or HPA).

As shown in FIG. 2A, a significant amount of time is spent performing the translation from virtual address to PA before the DMA write can be performed.

Accordingly, aspects of the present technology relate to systems and methods for reducing the latency associated with address translation by prefetching address translations in order to populate one or more caches with the translations. In more detail some aspects relate to priming IOMMU TLBs, address translation caches (ATC) of I/O devices, or both with the expected translations. In some examples of the present technology, the priming is initiated by the CPU core itself at the time of providing commands to the I/O device (e.g., DMA stream setup commands). In some examples of the present technology, the priming is accomplished by a controller of an I/O device that prefetches translations. Some examples of the present technology include multiple methods and apply one or more methods depending on the capabilities of the I/O device and/or characteristics of typical traffic streams associated with the I/O devices.

Figure 3A:
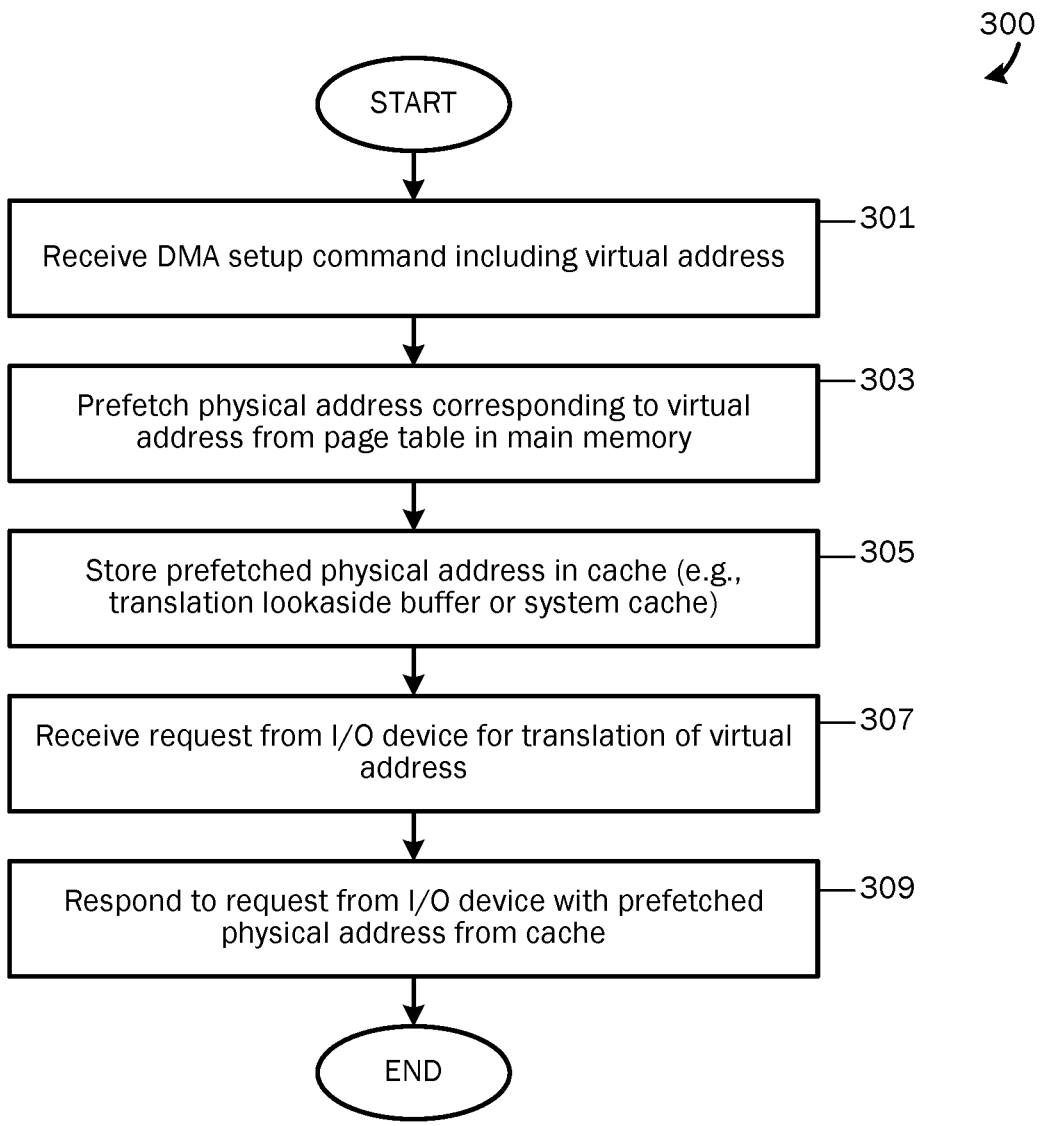
FIG. 3A is a flowchart of a method 300 for performing address translation prefetching by an IOMMU, as initiated by a CPU core, according to one example of the present technology.

FIG. 3A is a flowchart of a method 300 for performing address translation prefetching by an IOMMU, as initiated by a CPU core, according to one example of the present technology. In some examples, this method is performed by the IOMMU 118 as shown in FIG. 1.

Figure 3C:
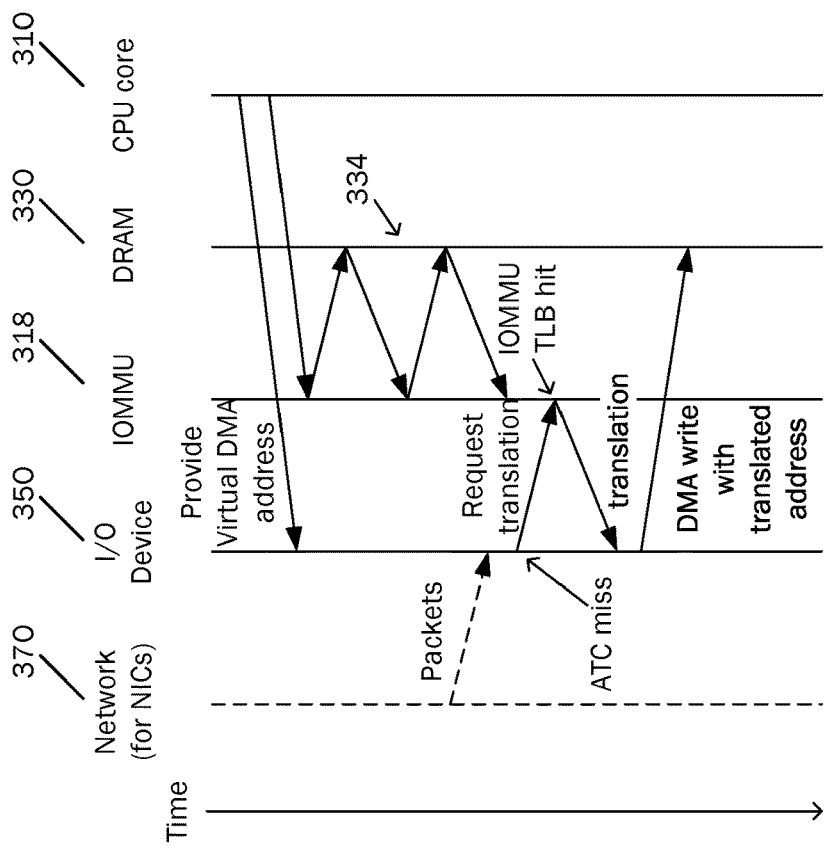
FIG. 3C is a timing diagram depicting timing of communications between an I/O device, an IOMMU, main memory, and a host processor core in the case of a DMA write from the I/O device to main memory with address translation prefetching by the IOMMU according to one example of the present technology.
Figure 3B:
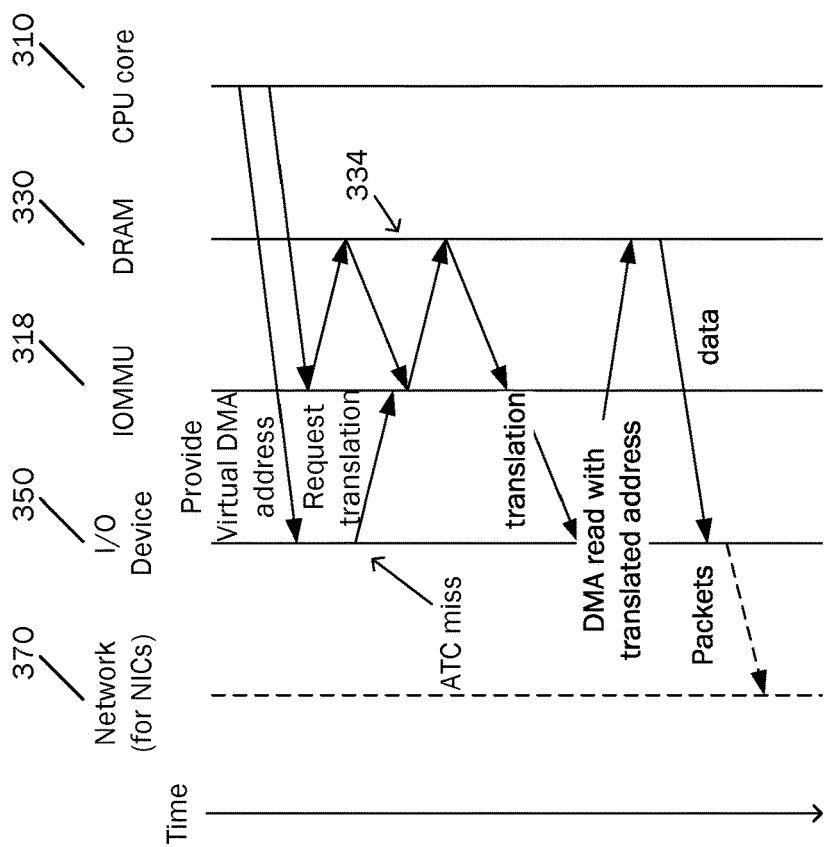
FIG. 3B is a timing diagram depicting timing of communications between an I/O device, an IOMMU, main memory, and a host processor core in the case of a DMA read from main memory to the I/O device with address translation prefetching by the IOMMU according to one example of the present technology.

FIG. 3B is a timing diagram depicting a DMA stream setup command and timing of communications between an I/O device, an IOMMU, main memory, and a CPU core in the case of a DMA read from main memory to the I/O device with address translation prefetching by the IOMMU according to one example of the present technology.

Referring to FIG. 3A and FIG. 3B, at operation 301, an IOMMU 318 receives a DMA stream setup command including a virtual address from a CPU core 310. In the example shown in FIG. 3B, a prefetch message including the virtual address is sent to the IOMMU 318 in parallel (or shortly after) sending a DMA stream setup command to an I/O device 350. In some examples, the same DMA stream setup command is transmitted to the IOMMU 318 to serve as the prefetch message including the virtual address to the IOMMU 318 (e.g., the DMA stream setup command is broadcast to both the IOMMU 318 and the I/O device 350). In some embodiments, different messages containing the same virtual address are sent to the I/O device 350 and the IOMMU 318.

At operation 303, the IOMMU 318 prefetches a physical address corresponding to the virtual address contained in the prefetch message, such as by performing a page walk at 334 through a page table stored in the DRAM 330 and, at operation 305, stores the resulting translation in the cache (TLB) of the IOMMU 318 (e.g., the TLB 119 of the IOMMU 118 shown in FIG. 1).

After receiving the DMA stream setup command, a DMA controller of the I/O device 350 attempts to perform a DMA read based on the virtual address specified in the DMA stream setup command. The DMA controller begins by checking its local cache (the address translation cache or ATC) for a cached translation for the specified virtual address. In the example shown in FIG. 3B, this is the first time the particular virtual address has been used by the I/O device 350 and therefore there will not be a cached translation in the ATC, therefore resulting in an ATC miss (cache miss). Accordingly, the DMA controller of the I/O device 350 requests an address translation from the IOMMU 318, which receives the request at operation 307. In the particular example shown in FIG. 3B, the IOMMU 318 receives the translation request before the page walk 334 is complete, and therefore the IOMMU 318 waits until after it receives the final translation before responding to the I/O device 350 at operation 309. Nevertheless, because the page walk 334 started earlier (e.g., in response to the translation request received from the CPU core 310), the time delay or latency between the translation request from the I/O device 350 and the response from the IOMMU 318 is shorter than without performing prefetching (compare the time between "Request translation" and the response "translation" in FIG. 3B with prefetching versus FIG. 2B without prefetching). In other circumstances, depending on the behavior of the I/O device 350, the translation request may be sent to the IOMMU 318 later, such as after the page walk 334 is complete, such that the prefetching of the address translation results in an immediate IOMMU TLB hit on the prefetched results.

As such, examples of the present technology reduce latency and accelerate the computation or retrieval of translations from virtual addresses (or guest virtual addresses) into corresponding physical addresses (PAs) for performing DMA read operations from main memory to an I/O device by prefetching the translations (e.g., looking up a HPA based on a corresponding GVA or GPA in the case of machine virtualization) associated with the corresponding virtual addresses.

FIG. 3C is a timing diagram depicting a DMA stream setup command and timing of communications between an I/O device, an IOMMU, main memory, and a CPU core in the case of a DMA write from the I/O device to main memory with address translation prefetching by the IOMMU according to one example of the present technology. According to one example, an IOMMU performs similar operations when prefetching an address translation for a write request (as shown in FIG. 3C) as when prefetching an address translation for performing read requests (as shown in FIG. 3B), and therefore operations performed by an IOMMU according to one example will be described in relation to the example method illustrated in FIG. 3A.

In a manner similar to that described in FIG. 3B, referring to FIG. 3A and FIG. 3C, at operation 301, an IOMMU 318 receives a DMA stream setup command including a virtual address from a CPU core 310. In the example shown in FIG. 3B, the DMA stream setup command is sent to the IOMMU 318 in parallel (or shortly after) sending a DMA stream setup command to an I/O device 350. In some examples, the same DMA stream setup command is transmitted to the IOMMU 318 to serve as the DMA stream setup command to the I/O device 350 (e.g., broadcast to both the IOMMU 318 and the I/O device 350). In some embodiments, different messages containing the same virtual address are sent to the I/O device 350 and the IOM MU 318.

At operation 303, the IOMMU 318 prefetches a physical address corresponding to the virtual address, such as by performing a page walk at 334 through a page table stored in the DRAM 330 and, at operation 305, stores the resulting translation in the cache (TLB) of the IOMMU 318 (e.g., the TLB 119 of the IOMMU 118 shown in FIG. 1).

After receiving the DMA stream setup command, a DMA controller of the I/O device 350 begins a process for writing data from the I/O device 350 to main memory 330 at the location specified by the DMA stream setup command. In the example shown in FIG. 3C where the I/O device 350 is a network interface controller (NIC), the writing is initiated by the receipt of network data packets from a network 370 at the I/O device 350. However, the present technology is not limited thereto and data may be received by an I/O device 350 or generated by an I/O device 350 to be written to main memory 330. For example, a graphics processing unit (GPU), artificial intelligence (AI) accelerator, or other computational device may produce computational results in response to input data and write the computed results to main memory 330.

When initiating the DMA write, the DMA controller attempts to look up the address translation for the virtual address specified in the DMA stream setup command in its local cache (e.g., ATC) local to the I/O device 350. In the particular example of FIG. 3C, this is the first time the particular virtual address has been used by the I/O device 350 and therefore there will not be a cached translation in the ATC, therefore resulting in an ATC miss (cache miss). Accordingly, the DMA controller of the I/O device 350 requests an address translation from the IOMMU 318, which receives the request at operation 307. In the particular example shown in FIG. 3C, the IOMMU 318 receives the translation request from the I/O device 350 after the page walk 334 is complete, and therefore this results in an IOMMU cache hit (translation lookaside buffer or TLB hit), such that the IOMMU can respond immediately to the I/O device with the address translation. In other circumstances, the IOMMU may receive the translation request before the page walk 334 is complete, such that the IOMMU must wait before it can respond to the translation request (similar to the timing shown in FIG. 3B).

In the examples presented above, IOMMU 318 is described as storing the prefetched PAs in a cache such as the translation lookaside buffer associated with the IOMMU 318, for example, TLB 119 associated with IOMMU 118 as shown in FIG. 1. However, the present technology is not limited thereto.

In some examples, in the IOMMU 318 stores the resulting translation in system level caches (such as the host cache 114 of the processor 110 as shown in FIG. 1) instead of, or in addition to, storing the translation in the TLB 119. In more detail, while translation cache misses are inevitable when first accessing translations (either on demand or by prefetching), it is possible for there to be capacity misses or conflict misses. Capacity misses occur when there are many traffic streams that are sharing the translation caches and their combined working set does not fit within the caches (e.g., there are more active translations than can fit in the TLB 119 of the IOMMU 118). Conflict misses occur when translations required by the same or different traffic streams 'map' into the same physical location of the TLB. Conflict misses are a function of the particular addresses associated with the translations and the behavior of the hash function applied to those addresses to map them to the limited space within the cache.

To mitigate the impact of such cache misses, some aspects of embodiments take advantage of available system level caches or host caches. Herein, the term system caches is intended to reflect a large, logical cache that is shared across all CPU cores 112 and I/O devices that are part of the same coherent domain. In some examples of the present technology, when fetching translations into the translation caches, the translations are stored in the system level caches (e.g., stored in both the TLB and the system level caches such as host cache 114). In some examples of the present technology, when a translation is displaced from the translation caches, the translation is allocated (e.g., stored or copied) into the system level caches such as host cache 114. In some examples, both types of allocations (or writes) of addresses into the system level caches are performed selectively by the IOMMU 118 based on attributes associated with the address translation, where the IOMMU 118 selectively stores translations into the system level caches in a manner that maintains cache coherency, data integrity, and program functionality. In some examples, the attributes include cache allocation attributes such as "Read Allocate" or "Allocate on Read." An IOMMU TLB miss will result in a read from memory. If this read is tagged with an "allocate" attribute, then the read will not only return data to the IOMMU but also allocate a copy of that data in the system level cache.

In such embodiments where translations are also stored in system level caches, in the event that a lookup of an address in the TLB results in an IOMMU TLB miss (e.g., the virtual address is not available in the TLB of the IOMMU), the IOMMU first checks the system level cache (e.g., host cache 114) for cached translations and, in the case of a system level cache hit, returns the cached translation or, in the case of a system level cache miss, performs a page walk to retrieve the translation from the page table in the main memory, and then stores the retrieved translation (e.g., physical address) in the IOMMU TLB and/or the system level caches in accordance with space availability, as guided by the attributes associated with the translation.

As such, examples of the present technology reduce latency and accelerate the computation or retrieval of translations from virtual addresses (or guest virtual addresses) into corresponding physical addresses (PAs) for performing DMA write operations from an I/O device to main memory by prefetching the PAs associated with the corresponding virtual addresses.

In the examples described and shown above in FIGS. 3A, 3B, and 3C, the IOMMU 318 prefetches the translation of the virtual address and awaits a translation request from the I/O device 350 before sending the translation to the I/O device. In some examples of the present technology, the IOMMU 318 transmits a translated address to the I/O device 350 in order to populate the local cache at the I/O device 350 (e.g., the ATC of the I/O device 350) in a "write push" to the cache.

Figure 3D:
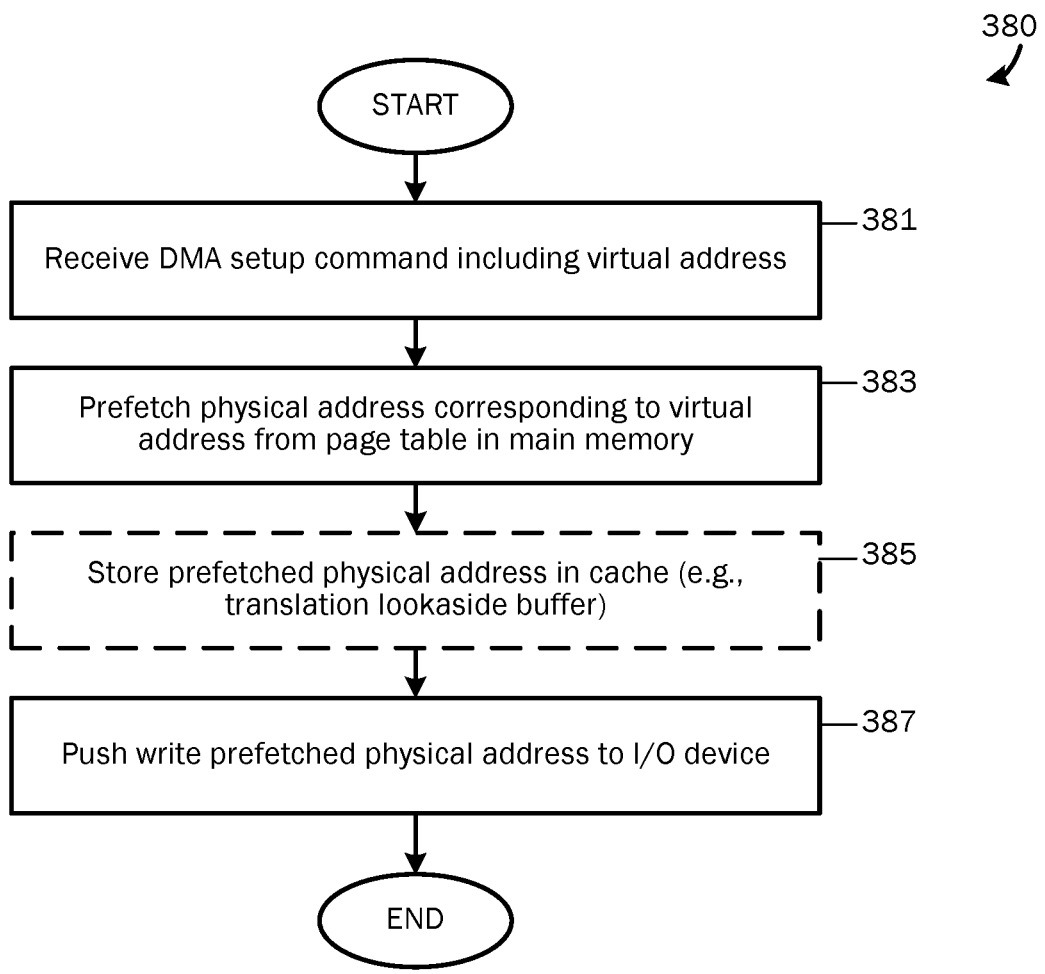
FIG. 3D is a flowchart of a method for performing address translation prefetching and write push to a cache of an I/O device by an IOMMU according to one example of the present technology.
Figure 3E:
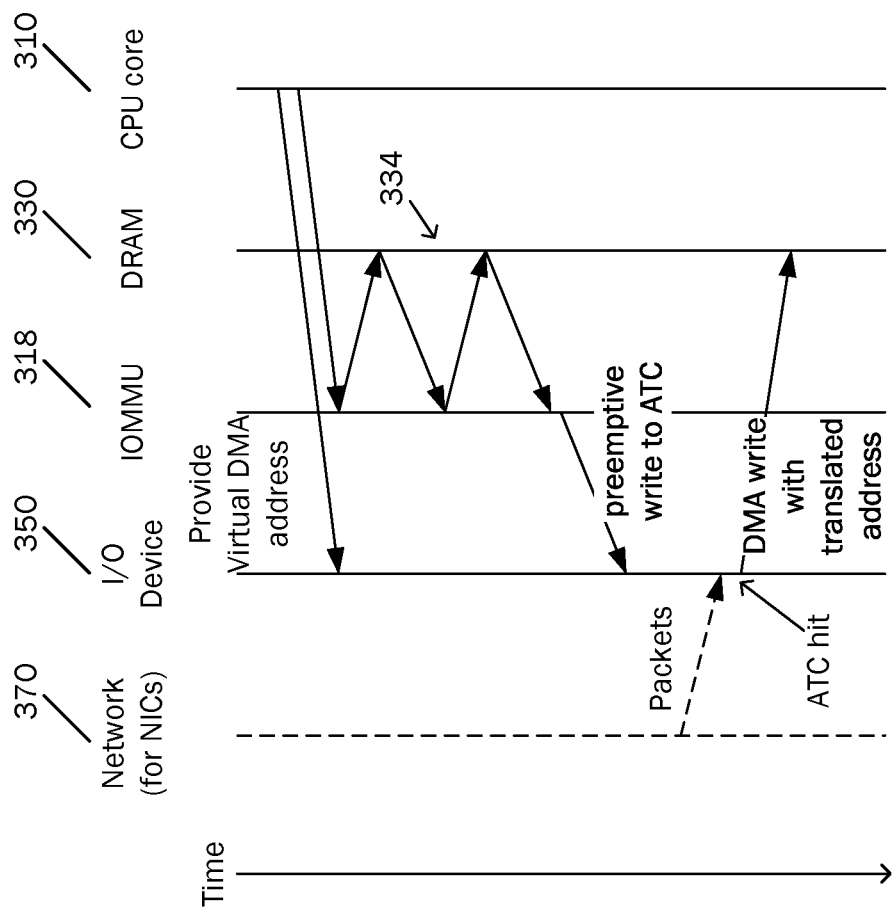
FIG. 3E is a timing diagram depicting timing of communications between an I/O device, an IOMMU, main memory, and a host processor core in the case of a DMA write from the I/O device to main memory with address translation prefetching by the IOMMU and write push to an address translation cache of the I/O device according to one example of the present technology.

FIG. 3D is a flowchart of a method 380 for performing address translation prefetching and write push to a cache of an I/O device by an IOMMU according to one example of the present technology. FIG. 3E is a timing diagram depicting a DMA stream setup command and timing of communications between an I/O device, an IOMMU, main memory, and a CPU core in the case of a DMA write from the I/O device to main memory with address translation prefetching by the IOMMU and write push to an address translation cache (ATC) of the I/O device according to one example of the present technology. FIG. 3D illustrates a write push to the ATC of the I/O device 350 in the context of a DMA write. However, the present technology is not limited thereto and may also be applied, for example, in the case of DMA read operations.

In a manner similar to that described in FIG. 3B and FIG. 3C, at operation 381, an IOMMU 318 receives a DMA stream setup command, including a virtual address, from a CPU core 310. In the example shown in FIG. 3D, the translation request is sent to the IOMMU 318 in parallel (or shortly after) sending a DMA stream setup command to an I/O device 350. In some examples, the same DMA stream setup command is transmitted to the IOMMU 318 to serve as the translation request to the IOMMU 318 (e.g., broadcast to both the IOMMU 318 and the I/O device 350).

At operation 383, the IOMMU 318 prefetches a physical address corresponding to the virtual address, such as by performing a page walk at 334 through a page table stored in the DRAM 330 and, optionally at operation 385, stores the resulting translation in the cache (TLB) of the IOMMU 318 (e.g., the TLB 119 of the IOMMU 118 shown in FIG. 1).

At operation 387, the IOMMU transmits the translation to the I/O device 350 (e.g., transmits the translation without receiving a translation request from the I/O device 350) to cause the I/O device 350 to write push the translation to the ATC of the I/O device 350.

In the particular timing shown in FIG. 3E, the write push of the address translation to the ATC of the I/O device 350 occurs before the arrival of data packets from the network 370. Accordingly, when the I/O device 350 prepares to perform a DMA write, the necessary translation (e.g., the PA corresponding to the virtual address specified in the DMA stream setup command received by the I/O device) is already present in the ATC and therefore a lookup of the virtual address by the DMA controller in the local cache results in an ATC hit and the DMA write with the translated address can proceed immediately (e.g., without additional latency associated with sending a translation request to the IOMMU).

While FIG. 3E illustrates the timing associated with a DMA write and a write push of a translation to an ATC of an I/O device 350, the present technology is not limited thereto and may also be applied to write push a translation to an ATC of an I/O device 350 in the case of a DMA read.

The examples described above with respect to FIGS. 3A, 3B, 3C, 3D, and 3E relate to performing prefetching of address translations by an IOMMU. However, examples of the present technology are not limited thereto. For example, in some examples, a controller (e.g. DMA controller) of an I/O device is configured to perform prefetching of address translations.

Figure 4A:
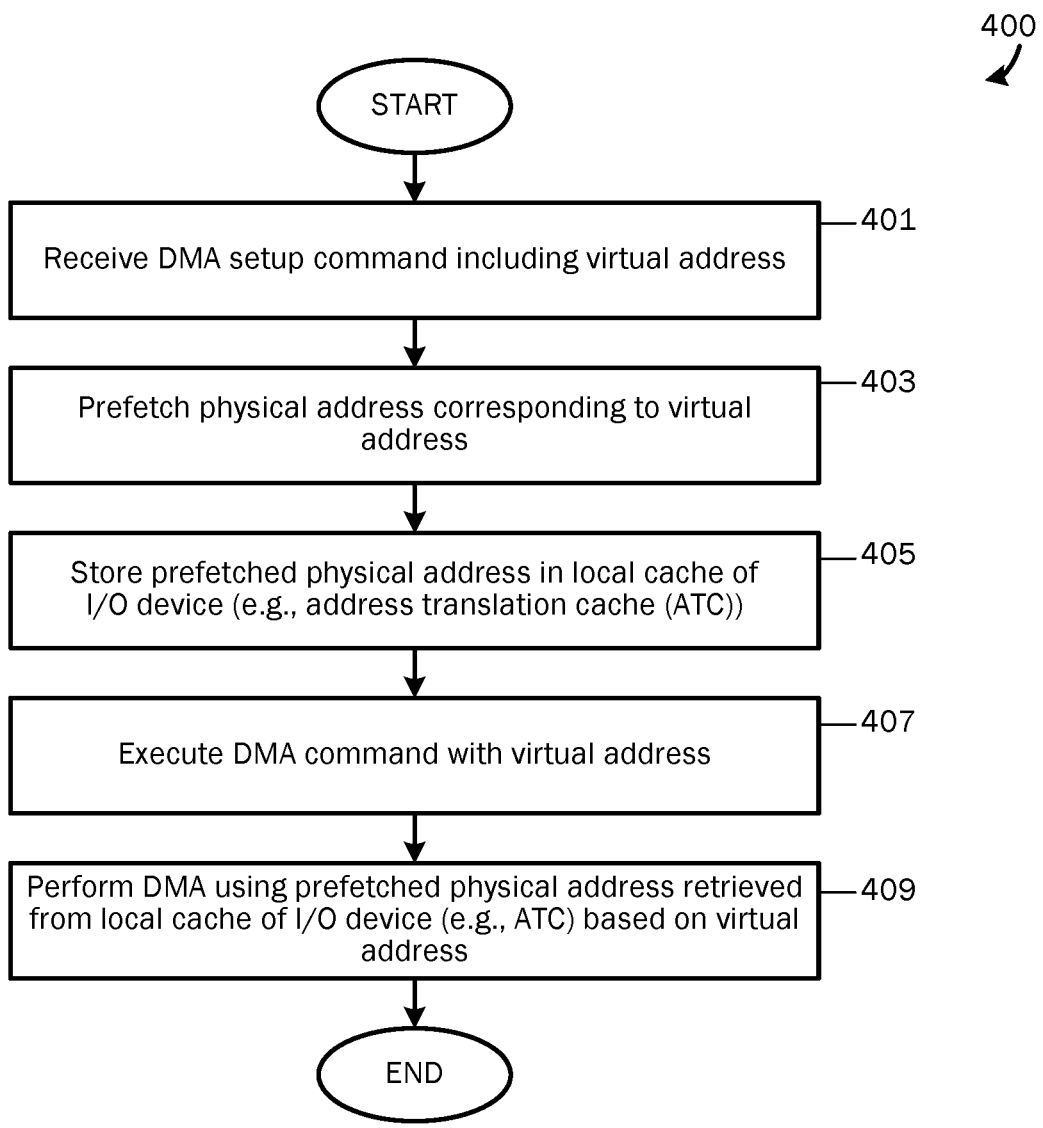
FIG. 4A is a flowchart of a method for performing address translation prefetching initiated by a controller of an I/O device according to one example of the present technology.
Figure 4B:
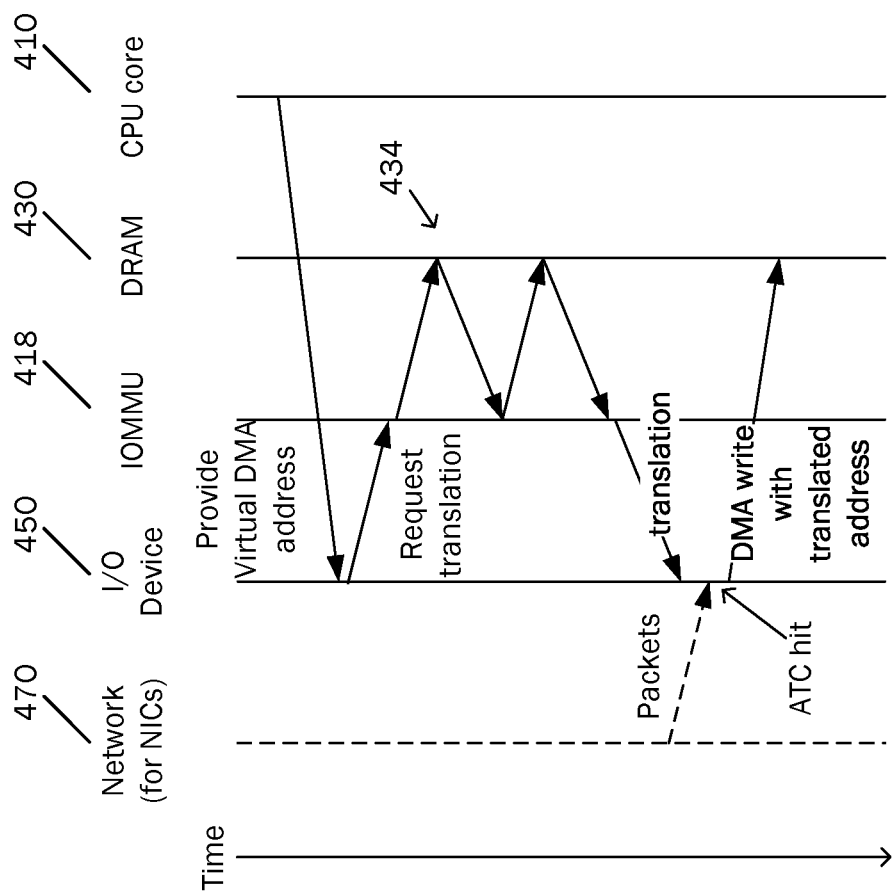
FIG. 4B is a timing diagram depicting timing of communications between an I/O device, an IOMMU, main memory, and a host processor core in the case of a DMA write from the I/O device to main memory with address translation prefetching by the I/O device according to one example of the present technology.

FIG. 4A is a flowchart of a method for performing address translation prefetching initiated by a controller of an I/O device according to one example of the present technology. FIG. 4B is a timing diagram depicting a DMA stream setup command and timing of communications between an I/O device, an IOMMU, main memory, and a CPU core in the case of a DMA write from the I/O device to main memory with address translation prefetching by the I/O device according to one example of the present technology.

In the example shown in FIGS. 4A and 4B, the prefetching of the address translation is initiated by the I/O device 450, and therefore it is sufficient for the I/O device 450 to receive a DMA stream setup command from the CPU core 410 (e.g., there is no need to transmit a separate DMA stream setup command or other message containing the virtual address from the CPU core 410 directly to the IOMMU 418).

At operation 401, the I/O device 450 (e.g., a DMA controller of the I/O device 450), receives a DMA stream setup command including a virtual address, where the DMA stream setup command may have been sent by the CPU core 410. At operation 403, the I/O device 450 prefetches the translation of the virtual address into the physical address by sending a translation request to the IOMMU 418. Operation 403 is a considered a prefetch because the I/O device 450 has not yet started to perform a DMA operation (e.g., a DMA read or a DMA write) using the DMA stream associated with the virtual address. For example, the DMA controller of the I/O device 450 may transmit the translation request in response to receiving the DMA stream setup command (as opposed to requesting a translation in response to determining that data is to be written to main memory using the DMA stream or read from main memory using the DMA stream).

The IOMMU 418 may check its caches (e.g., the TLB and system level caches, if applicable) to determine if there is a cache hit. If not, then, as shown in the example of FIG. 4B, the IOMMU performs a page walk 434 through the main memory DRAM 430 to obtain the translation (e.g., the physical address corresponding to the virtual address), which the IOMMU 418 returns to the I/O device 450. At operation 405, the I/O device stores the prefetched translation (e.g., the prefetched physical address) in the address translation cache (ATC).

Accordingly, when the I/O device 450 needs to execute a DMA command at operation 407, such as a DMA write due to the arrival of data packets from the network 470 in the case where the I/O device 450 is a network interface controller, the ATC is primed with the necessary address translation, as specified by the DMA stream setup command. As such, the I/O device can perform the DMA operation at operation 409 using the prefetched physical address retrieved from the local cache (e.g., the ATC) looked-up based on the virtual address (an ATC hit) without incurring latency associated with performing an address translation (e.g., traversing the interconnect 140 to access the IOMMU and, in some cases, performing a page walk through the page table stored in main memory). Compare, for example, the latency between the arrival of packet data and performing the DMA data write in FIG. 4B against the corresponding latency without performing prefetching, as shown in FIG. 2B, or where the translation is prefetched in the IOMMU without further pushing a write to the ATC as shown in the example of FIG. 3C.

Some examples of the present technology relate to selection between different methods for priming caches such as the address translation cache (ATC) of an I/O device, the translation lookaside buffer (TLB) of the IOMMU, and/or system level caches of the processor. As noted above, in some examples, translations are associated with attributes, and the attributes are used to select between different prefetching methods. For example, initiating the prefetching of the translation by the I/O device as shown in the example of FIG. 4A and FIG. 4B is more effective when there is more time between the DMA stream setup command and the first DMA operation performed by the I/O device in accordance with the DMA stream setup command. For example, in the case of an immediate DMA read based on the DMA stream setup command such as in the example shown in the timing diagram of FIG. 2A, implementing prefetching by the I/O device would result in substantially no reduction in latency. On the other hand, as shown in the timing diagram of FIG. 3B, in this particular case of a DMA read operation, prefetching at the IOMMU can reduce latency because the IOMMU can begin the translation process (e.g., the page walk) while the I/O device 250 is processing the DMA stream setup command and preparing and sending the request translation.

Therefore, in some examples, the CPU core selects between different methods of performing prefetching of address translations, such as by determining whether to send an address translation prefetch command directly to the IOMMU and/or to instruct the DMA controller of the I/O device to perform a prefetch of the address translation, where the determination is based on attributes such as whether the I/O device is capable of performing prefetches, whether the DMA stream is a DMA read stream or a DMA write stream, the expected timing between a DMA stream setup command and the first DMA operation, and the like.

It is desirable for prefetched translations to remain in the translation caches until they are used. Some comparative cache eviction policies (or translation cache replacement policies) retain translations that are frequently used and discard the translations that are least recently used (a least recently used or LRU policy). However, assuming that each DMA stream setup command creates a DMA stream that will eventually be used, prefetching a translation and then evicting it from the cache without making use of the address translation results in wasted effort performing page walks because those page walks must be performed again when the DMA stream is eventually used.

As such, some examples of the present technology relate to explicit retention (e.g., protection from eviction) of prefetched translations until those prefetched translations are used at least a threshold number of times, where the threshold number is greater than zero, where the particular threshold number may be specified in accordance with the attributes of the DMA stream (e.g., based on typical access patterns). The number of times a prefetched translation has been used or accessed is monitored and recorded by a controller managing the particular cache, such as a DMA controller of an I/O device in the case of addresses stored in an ATC and an IOMMU in the case of addresses stored in an IOMMU TLB or system level cache, such as by storing a count of the number of accesses as metadata in the cache. After a prefetched translation has been used at least the specified threshold number of times, then a standard cache eviction policy, such as in accordance with a least recently used (LRU) policy.

Therefore, examples of the present technology improve the performance direct memory access (DMA) operations between I/O devices and main memory, by prefetching address translations to reduce or avoid latency associated with performing address translations, such as latency due to traversing in interconnect (e.g., a PCIe interconnect) and due to performing page walks through page tables stored in main memory. Some examples of the present technology relate to performing initiating a prefetch from a CPU core by transmitting a message to a IOMMU to prefetch an address translation for a particular virtual address and to store the address translation in a translation lookaside buffer (TLB) or other cache, where the IOMMU begins to perform a page walk prior to receiving an translation request for the virtual address from an I/O device. Some examples of the present technology relate to initiating a prefetch from an I/O device in response to receiving a DMA stream setup command, instead of in response to preparing to perform a DMA command. Some examples of the present technology relate to cache eviction policies that protect prefetched translations from eviction from caches until they have been accessed a specified number of times.

Figure 5:
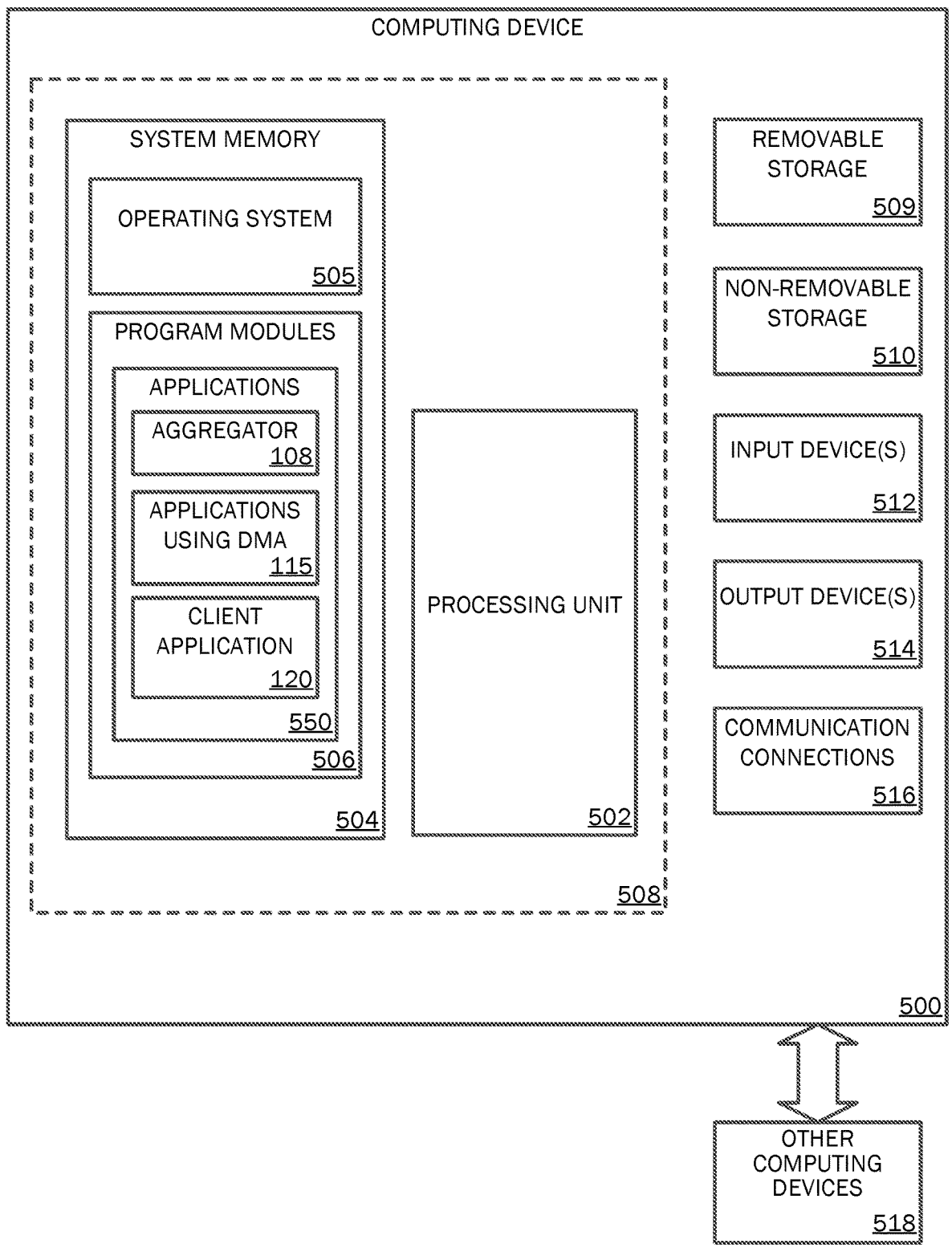
FIG. 5 is a block diagram illustrating example physical components of a computing device with which aspects of the invention may be practiced.

FIGS. 5 and 6 and the associated descriptions provide a discussion of a variety of operating environments in which examples of the invention may be practiced. However, the devices and systems illustrated and discussed with respect to FIGS. 5 and 6 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the computing device 100 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as the aggregator 108, applications making use of direct memory accesses 115, or client application 120. The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, configuration and use of DMA streams between I/O devices and the main memory (or DRAM) portions of system memory 504. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to performing prefetching of address translations, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
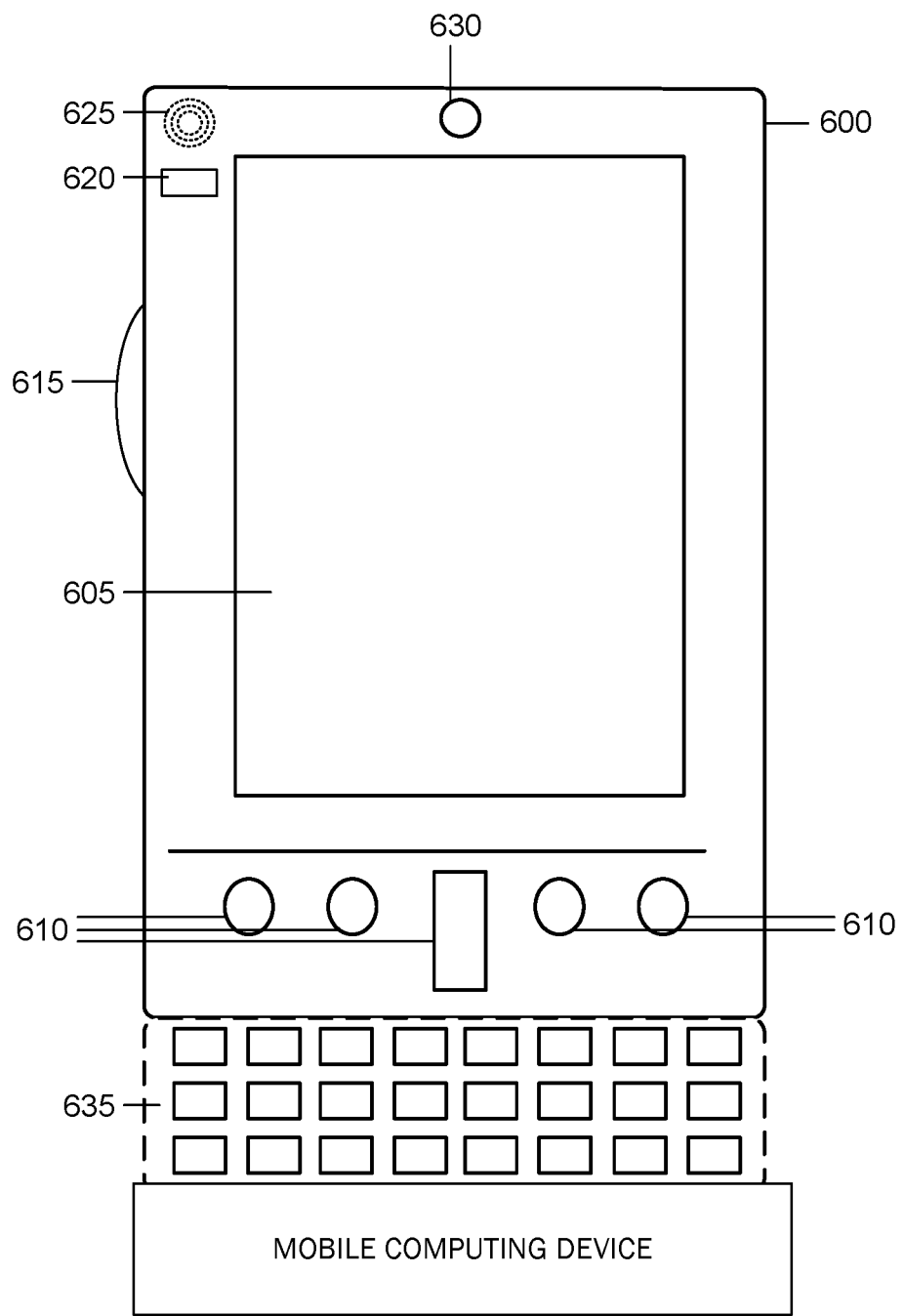
FIGS. 6A and 6B are simplified block diagrams of a mobile computing device with which aspects of the present invention may be practiced.
Figure 6B:
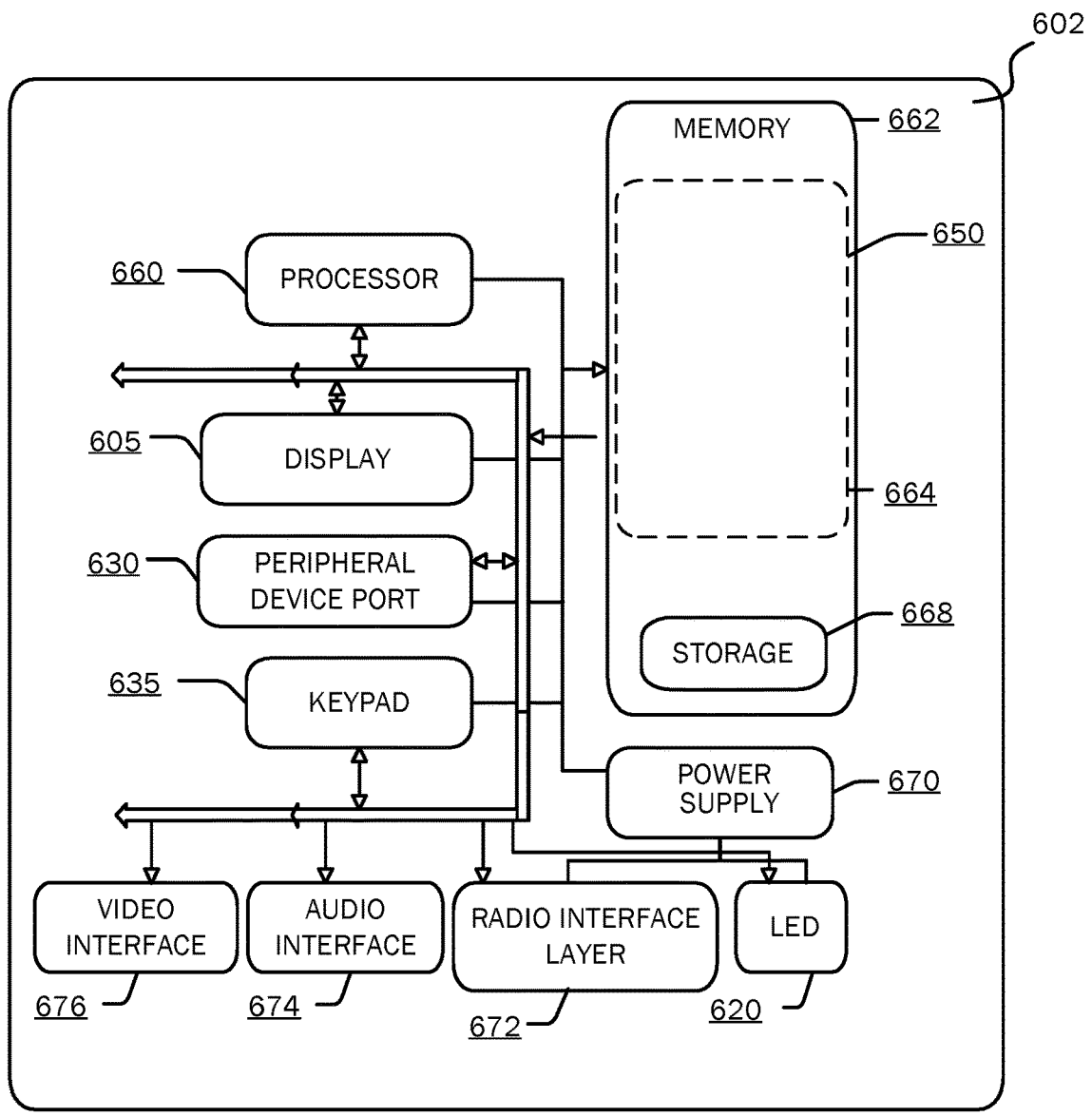

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

According to one example of the present technology, an input/output memory management unit (IOMMU) of a computing device is configured to: receive a prefetch message including a virtual address from a central processing unit (CPU) core of a processor of the computing device; perform a page walk on the virtual address through a page table stored in a main memory of the computing device to obtain a prefetched translation of the virtual address to a physical address; and store the prefetched translation of the virtual address to the physical address in a translation lookaside buffer (TLB) of the IOMMU. The IOMMU may be further configured to: receive a translation request including the virtual address from an input/output device; and respond to the translation request with the prefetched translation of the virtual address to the physical address.

The IOMMU may be further configured to write push the prefetched translation of the virtual address to an input/output device identified in the prefetch message without receiving a translation request from the input/output device. The IOMMU may control the input/output device to store the prefetched translation in an address translation cache of the input/output device.

The IOMMU may be further configured to: monitor a number of times the prefetched translation stored in the TLB is used; and protect the prefetched translation from eviction from the TLB while the number of times the prefetched translation is used is less than a threshold number of times, where the threshold number is greater than zero.

The IOMMU may be further configured to store the prefetched translation in a host cache of the computing device. The IOMMU may be further configured to store the prefetched translation in the host cache in response to detecting that the prefetched translation is displaced from the TLB.

According to one example of the present technology, an input/output device includes: a controller configured to perform direct memory access (DMA) operations with a main memory of a computing device connected to the input/output device, the controller being configured to: receive a DMA stream setup command including a virtual address; transmit a translation request to a system memory management unit (SMMU) to receive a prefetched translation of the virtual address to a physical address; and store the prefetched translation of the virtual address to the physical address in an address translation cache of the input/output device.

The controller may be further configured to: lookup the prefetched translation of the virtual address to the physical address in the address translation cache; and perform a DMA operation with the main memory of the computing device based on the prefetched translation.

The controller may be further configured to: monitor a number of times the prefetched translation stored in the address translation cache is used; and protect the prefetched translation from eviction from the address translation cache while the number of times the prefetched translation is used is less than a threshold number of times, where the threshold number is greater than zero.

According to one example of the present technology, a computing device includes: a processor including: a central processing unit (CPU) core; and a system memory management unit (SMMU) including a translation lookaside buffer (TLB); a main memory storing a page table; and an input/output (I/O) device connected to the processor and the main memory via an interconnect, the CPU core being configured to: transmit a direct memory access (DMA) stream setup command to the I/O device, the DMA stream setup command including a virtual address; the SMMU being configured to: prefetch a translation of the virtual address into a physical address; and store the prefetched translation of the virtual address into the physical address in the TLB; the I/O device being configured to: receive the DMA stream setup command; receive the prefetched translation of the virtual address from the SMMU; and execute a DMA operation with the main memory based on the prefetched translation of the virtual address.

The CPU core may be configured to transmit a prefetch message to the SMMU, the prefetch message including the virtual address included in the DMA stream setup command.

The SMMU may be configured to prefetch the translation of the virtual address into the physical address in response to the prefetch message.

The SMMU may be further configured to: monitor a number of times the prefetched translation stored in the TLB is used; and protect the prefetched translation from eviction from the TLB while the number of times the prefetched translation is used is less than a threshold number of times, where the threshold number is greater than zero.

The processor may include a host cache, and the SMMU may be further configured to: store the prefetched translation in the host cache of the computing device. SMMU may be further configured to store the prefetched translation in the host cache based on one or more attributes associated with the prefetched translation.

The SMMU may be configured to write push the prefetched translation to the I/O device via the interconnect, and the I/O device may be configured to store the prefetched translation, write pushed by the SMMU, in an address translation cache of the I/O device.

The I/O device may be configured to: send a translation request including the virtual address to the SMMU in response to receiving the DMA stream setup command; and store the prefetched translation in an address translation cache (ATC) local to the I/O device.

The I/O device may be further configured to: lookup the prefetched translation of the virtual address to the physical address in the ATC; and perform a DMA operation with the main memory of the computing device based on the prefetched translation.

According to one example of the present technology, a non-transitory computer readable medium stores instructions that, when executed by a processor, cause the processor to prime a translation lookaside buffer (TLB) of an input/output memory management unit (IOMMU) by: sending, by a CPU core of the processor, a DMA stream setup command to an input/output (PO) device, the DMA stream setup command including a virtual address; and sending, from the CPU core of the processor, a prefetch message including the virtual address to the IOMMU to cause the IOMMU to: prefetch a translation of the virtual address into a corresponding physical address from a main memory; and store the translation of the virtual address into the corresponding physical address in the TLB of the IOMMU.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way.

The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. An input/output memory management unit (IOMMU) of a computing device configured to:
   receive a prefetch message comprising a virtual address from a central processing unit (CPU) core of a processor of the computing device;
   receive a translation request comprising the virtual address from an input/output device after receiving the prefetch message from the CPU;
   perform a page walk on the virtual address through a page table stored in a main memory of the computing device to obtain a prefetched translation of the virtual address to a physical address, wherein IOMMU begins to perform the page walk prior to receiving the translation request from the input/output device;
   store the prefetched translation of the virtual address to the physical address in a translation lookaside buffer (TLB) of the IOMMU; and
   respond to the translation request from the input/output device with the prefetched translation of the virtual address to the physical address.

2. The IOMMU of claim 1, further configured to write push the prefetched translation of the virtual address to an input/output device identified in the prefetch message without receiving a translation request from the input/output device.

3. The IOMMU of claim 2, wherein IOMMU controls the input/output device to store the prefetched translation in an address translation cache of the input/output device.

4. The IOMMU of claim 1, further configured to:
   monitor a number of times the prefetched translation stored in the TLB is used; and
   protect the prefetched translation from eviction from the TLB while the number of times the prefetched translation is used is less than a threshold number of times, where the threshold number is greater than zero.

5. The IOMMU of claim 1, further configured to store the prefetched translation in a host cache of the computing device.

6. The IOMMU of claim 5, further configured to store the prefetched translation in the host cache in response to detecting that the prefetched translation is displaced from the TLB.

7. A computing device comprising:
   a processor comprising:
      a central processing unit (CPU) core; and
      a system memory management unit (SMMU) comprising a translation lookaside buffer (TLB);
   a main memory storing a page table; and
   an input/output (I/O) device connected to the processor and the main memory via an interconnect,
   the CPU core being configured to:
      transmit a direct memory access (DMA) stream setup command to the I/O device, the DMA stream setup command comprising a virtual address; and
      transmit a prefetch message to the SMMU, the prefetch message comprising the virtual address included in the DMA stream setup command;
   the SMMU being configured to, in response to the prefetch message:
      prefetch a translation of the virtual address into a physical address; and
      store the prefetched translation of the virtual address into the physical address in the TLB; and
      receive an address translation request from the I/O device after receiving the prefetch message from the CPU, wherein SMMU begins to perform a page walk through the page table to prefetch the translation of the virtual address prior to receiving the translation request from the input/output device; and
   the I/O device being configured to:
      receive the DMA stream setup command;
      receive the prefetched translation of the virtual address from the SMMU in response to the address translation request to the SMMU; and
      execute a DMA operation with the main memory based on the prefetched translation of the virtual address.

8. The computing device of claim 7, wherein the SMMU is further configured to:
   monitor a number of times the prefetched translation stored in the TLB is used; and
   protect the prefetched translation from eviction from the TLB while the number of times the prefetched translation is used is less than a threshold number of times, where the threshold number is greater than zero.

9. The computing device of claim 7, wherein the processor comprises a host cache, and
   wherein the SMMU is further configured to:
   store the prefetched translation in the host cache of the computing device.

10. The computing device of claim 9, wherein the SMMU is further configured to store the prefetched translation in the host cache based on one or more attributes associated with the prefetched translation.

11. The computing device of claim 7, wherein the SMMU is configured to write push the prefetched translation to the I/O device via the interconnect, and
    wherein the I/O device is configured to store the prefetched translation, write pushed by the SMMU, in an address translation cache of the I/O device.

12. The computing device of claim 7, wherein the I/O device is configured to:

send a translation request comprising the virtual address to the SMMU in response to receiving the DMA stream setup command; and store the prefetched translation in an address translation cache (ATC) local to the I/O device.

13. The computing device of claim 12, wherein the I/O device is further configured to:

lookup the prefetched translation of the virtual address to the physical address in the ATC; and perform a DMA operation with the main memory of the computing device based on the prefetched translation.

14. A non-transitory computer readable medium storing instructions that, when executed by a processor, cause the processor to prime a translation lookaside buffer (TLB) of an input/output memory management unit (IOMMU) by:

sending, by a CPU core of the processor, a DMA stream setup command to an input/output (I/O) device, the DMA stream setup command comprising a virtual address; and sending, from the CPU core of the processor, a prefetch message comprising the virtual address to the IOMMU to cause the IOMMU to:

prefetch a translation of the virtual address into a corresponding physical address from a main memory;

receive a translation request comprising the virtual address from the input/output device after receiving the prefetch message from the CPU, wherein the IOMMU begins to perform a page walk to prefetch the translation of the virtual address prior to receiving the translation request from the input/output device;

store the translation of the virtual address into the corresponding physical address in the TLB of the IOMMU; and respond to the translation request from the input/output device with the prefetched translation of the virtual address to the corresponding physical address.

\* \* \* \* \*